(12) United States Patent
Venkataramani et al.

(10) Patent No.: US 7,823,374 B2
(45) Date of Patent: Nov. 2, 2010

(54) HEAT TRANSFER SYSTEM AND METHOD FOR TURBINE ENGINE USING HEAT PIPES

(75) Inventors: Kattalaicheri Srinivasan Venkataramani, West Chester, OH (US); Thomas Ory Moniz, Loveland, OH (US); Justin P. Stephenson, Cincinnati, OH (US); William Andrew Bailey, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1093 days.

(21) Appl. No.: 11/469,234

(22) Filed: Aug. 31, 2006

(65) Prior Publication Data

US 2008/0053100 A1   Mar. 6, 2008

(51) Int. Cl.
*F02C 7/047* (2006.01)
*F02K 3/04* (2006.01)
(52) U.S. Cl. .................. 60/39.093; 60/226.1; 60/39.83
(58) Field of Classification Search .............. 60/39.093, 60/39.83, 226.1; 165/104.26
See application file for complete search history.

(56) References Cited

U.S. PATENT DOCUMENTS

| | | | | |
|---|---|---|---|---|
| 2,712,727 A * | 7/1955 | Morley et al. ............ | 60/39.093 |
| 3,965,681 A | 6/1976 | Wyczalek et al. | |
| 4,151,710 A * | 5/1979 | Griffin et al. ............... | 60/39.08 |
| 4,186,559 A | 2/1980 | Decker et al. | |
| 4,199,300 A | 4/1980 | Tubbs | |
| 4,207,027 A | 6/1980 | Barry et al. | |
| 4,218,179 A | 8/1980 | Barry et al. | |
| 4,240,257 A | 12/1980 | Rakowsky et al. | |
| 4,419,044 A | 12/1983 | Barry et al. | |
| 4,671,348 A * | 6/1987 | Bauer ..................... | 165/104.26 |
| 4,921,041 A * | 5/1990 | Akachi .................. | 165/104.26 |
| 5,046,920 A | 9/1991 | Higashi et al. | |
| 5,077,103 A * | 12/1991 | Wagner et al. ......... | 165/104.14 |
| 5,178,514 A | 1/1993 | Damiral | |
| 5,192,186 A | 3/1993 | Sadler | |
| 5,439,351 A | 8/1995 | Artt | |
| 5,878,808 A | 3/1999 | Rock et al. | |
| 5,964,279 A | 10/1999 | Mochizuki et al. | |
| 5,975,841 A | 11/1999 | Lindemuth et al. | |
| 5,979,220 A | 11/1999 | Zombo et al. | |
| 6,027,078 A * | 2/2000 | Crouch et al. ............. | 244/53 B |
| 6,308,524 B1 | 10/2001 | Mochizuki et al. | |
| 6,766,817 B2 | 7/2004 | Da Silva | |
| 6,918,404 B2 | 7/2005 | Dias Da Silva | |
| 6,990,797 B2 | 1/2006 | Venkataramani et al. | |
| 7,066,586 B2 | 6/2006 | Da Silva | |
| 7,581,378 B2 * | 9/2009 | Brand et al. ............. | 60/39.093 |
| 2005/0050877 A1 * | 3/2005 | Venkataramani et al. . | 60/39.093 |

FOREIGN PATENT DOCUMENTS

GB       2136880 A       9/1984
WO    WO 2005/073539    *  8/2005

* cited by examiner

*Primary Examiner*—Ted Kim
(74) *Attorney, Agent, or Firm*—Adams Intellectual Property Law; David L. Narciso, Esq.

(57) ABSTRACT

A heat transfer system is provided for a turbine engine of the type including an annular inlet cowling. The heat transfer system includes at least one heat pipe disposed in contact with an interior of the casing. The heat pipe is thermally coupled to a heat source, such that heat from the heat source can be transferred through the heat pipe and into the inlet cowling.

13 Claims, 6 Drawing Sheets

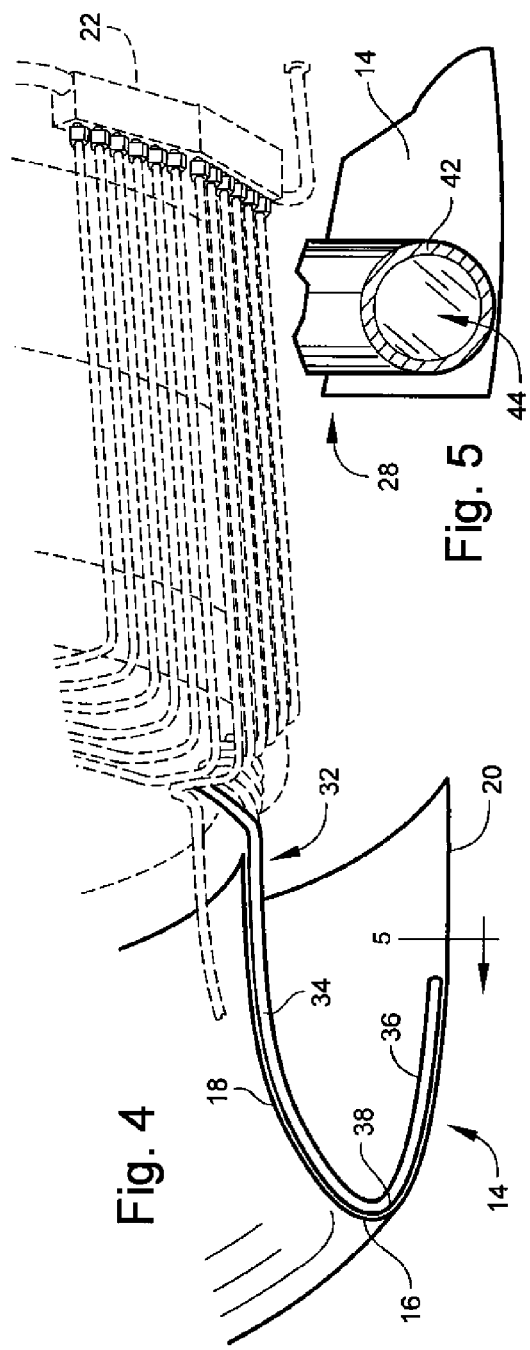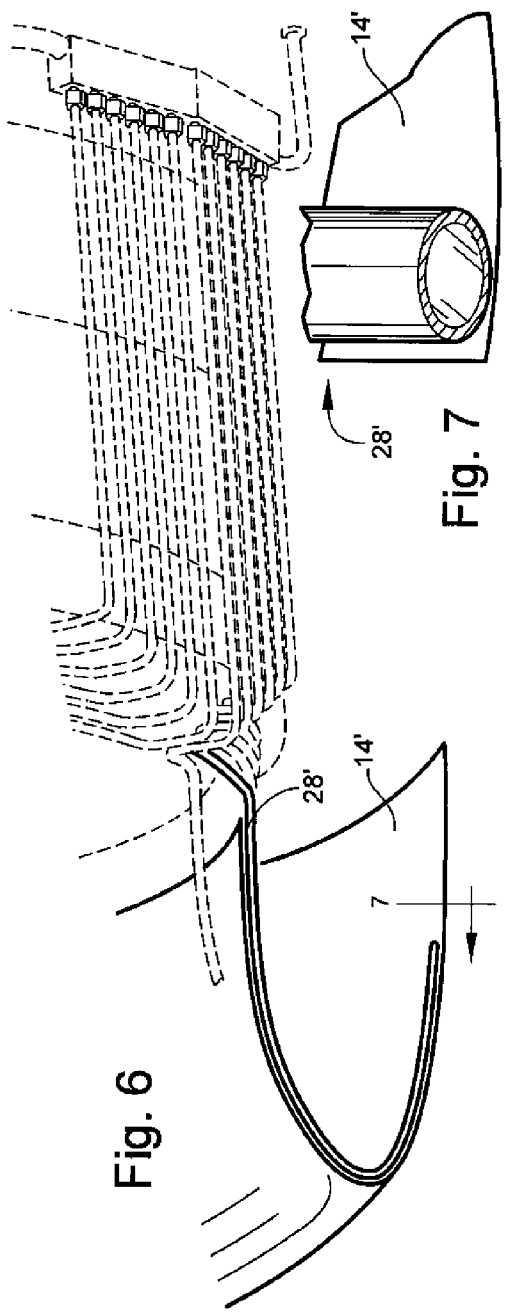

US 7,823,374 B2

HEAT TRANSFER SYSTEM AND METHOD FOR TURBINE ENGINE USING HEAT PIPES

BACKGROUND OF THE INVENTION

This invention relates generally to turbine engines, and more particularly to a system and method using heat pipes for transferring heat within a gas turbine engine.

Gas turbine engines use pressurized oil to lubricate and cool various components (e.g. bearings, etc.). The oil picks up significant heat in the process which must be rejected to maintain the oil temperature within acceptable limits. Prior art gas turbine engines often employ heat exchangers to cool the engine oil using a relatively cool air stream such as fan discharge air. In turbofan engines, this heat exchanger is often located in the fan duct flow path. This configuration results in a pressure loss and hence a significant fuel burn penalty. It has been estimated that the specific fuel consumption (SFC) penalty associated with this type of configuration can be as high as 1%. There are also cost and weight penalties associated with this configuration.

In addition, in some engines, exposed components such as the lip of the inlet cowling accrete ice under certain environmental conditions. Ice accumulation within the engine and over exposed engine structures may be significant. The accreted ice may lead to partial blocking of the fan flowpath and fan instability. The accumulated ice can also be suddenly shed, for example through continued operation of the engine, a throttle burst from lower power operation to higher power operation, or vibrations due to either turbulence or asymmetry of ice accretion.

Various prior art methods exist for anti-icing, for example, running the engine with an increased operating temperature, directing high temperature bleed air from the engine compressor to the exposed surfaces, spraying the engine with a deicing solution prior to operation, and electric resistance heating. However, all of these methods have various disadvantages. The increased operating temperature and the bleed systems may decrease engine performance. Such systems may also require valves to turn off the flow of the high temperature air during take-off and other high power operations to protect the engine. Deicing fluid provides protection for only a limited time. Electrical heating requires large quantities of electricity for performing the de-icing operation and may require additional electrical generators, electrical circuits and complex interaction logic with the airplane's computers with the attendant increased cost, weight and performance penalties.

BRIEF SUMMARY OF THE INVENTION

The above-mentioned shortcomings in the prior art among others are addressed by the present invention, which provides a heat transfer system that removes waste heat from the engine lubrication oil and transfers that heat to engine components that require heating, for example for anti-icing or de-icing purposes. This heat is transferred using heat pipes which are lightweight, sealed, and passive, requiring no valves or pumps. Furthermore, the heat pipes may use a working fluid which is non-flammable to avoid creating a fire hazard within the engine.

According to one aspect, the invention provides a heat transfer system for a turbine engine including an inlet cowling. The heat transfer system includes: at least one heat pipe having at least a section thereof disposed in contact with an interior of the inlet cowling, the heat pipe being thermally coupled to a heat source, such that heat from the heat source can be transferred through the heat pipe to the inlet cowling.

According to another aspect, a gas turbine engine includes: an inlet cowling; a plurality of heat pipes, at least a section of each heat pipe being disposed against an interior surface of the inlet cowling; and a heat source thermally coupled to the heat pipes such that heat from the heat source can be transferred through the heat pipes to the inlet cowling.

According to another aspect, a method is provided for transferring heat in a turbine engine having an inlet cowling. The method includes: providing a plurality of heat pipes, at least a portion of each heat pipe being disposed against an interior surface of the inlet cowling; thermally coupling the heat pipes to a heat source; and receiving heat from the heat source in the heat pipes and transferring the heat to the inlet cowling.

BRIEF DESCRIPTION OF THE DRAWINGS

The invention may be best understood by reference to the following description taken in conjunction with the accompanying drawing figures in which:

FIG. 4 is an enlarged perspective view of a configuration of heat pipes disposed around the periphery of the fan module of FIG. 1;

FIG. 5 is a view showing a cross-sectional shape of one of the heat pipes of FIG. 4;

FIG. 6 is an enlarged perspective view of an alternative configuration of heat pipes disposed around the periphery of the fan module of FIG. 1; and FIG. 7 is a view showing a cross-sectional shape of one of the heat pipes of FIG. 6.

DETAILED DESCRIPTION OF THE INVENTION

Figure 1:
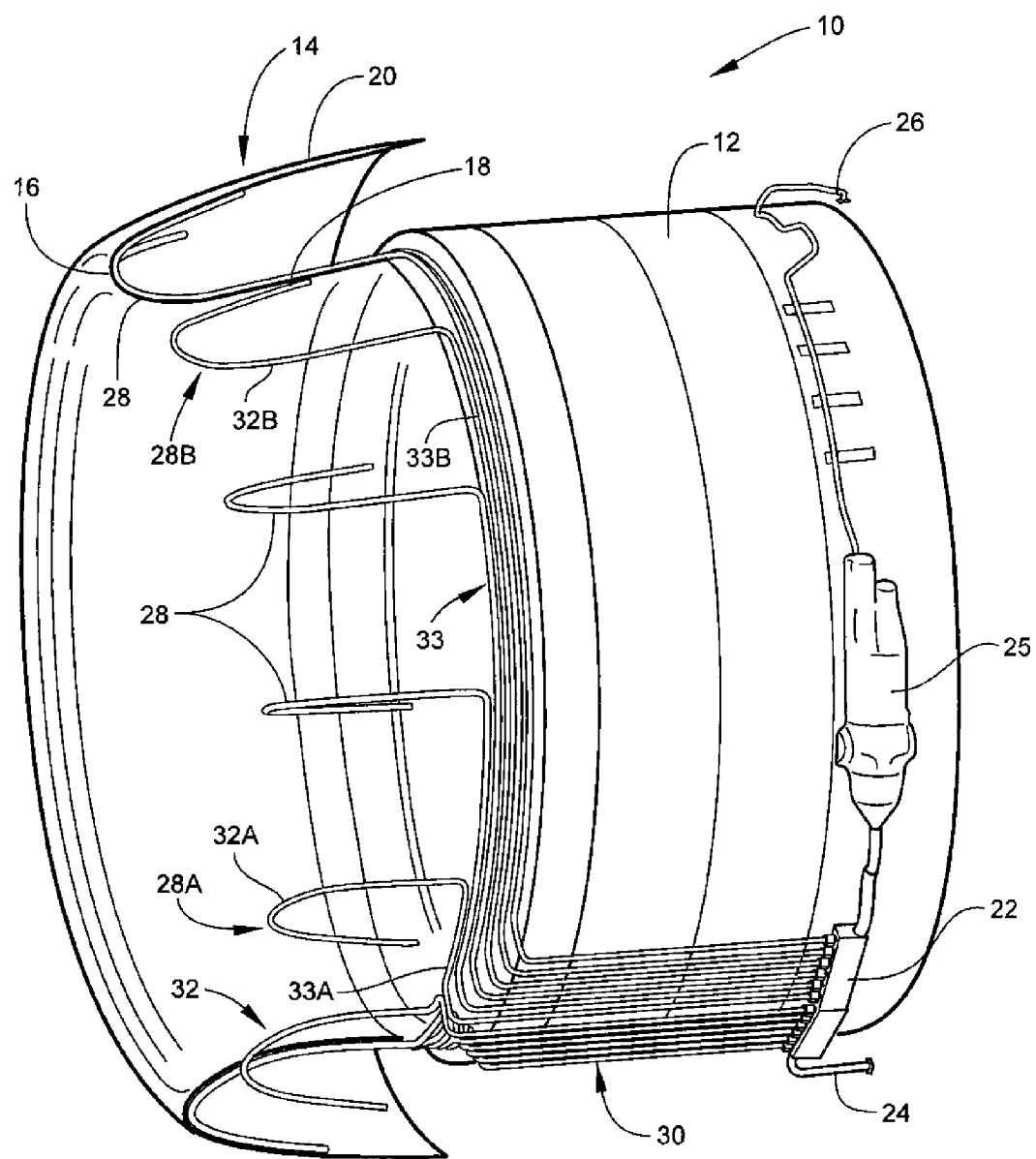
FIG. 1 is a perspective, partially cut-away view of a portion of a fan module of a gas turbine engine including a heat transfer system constructed in accordance with an aspect of the present invention.
Figure 2:
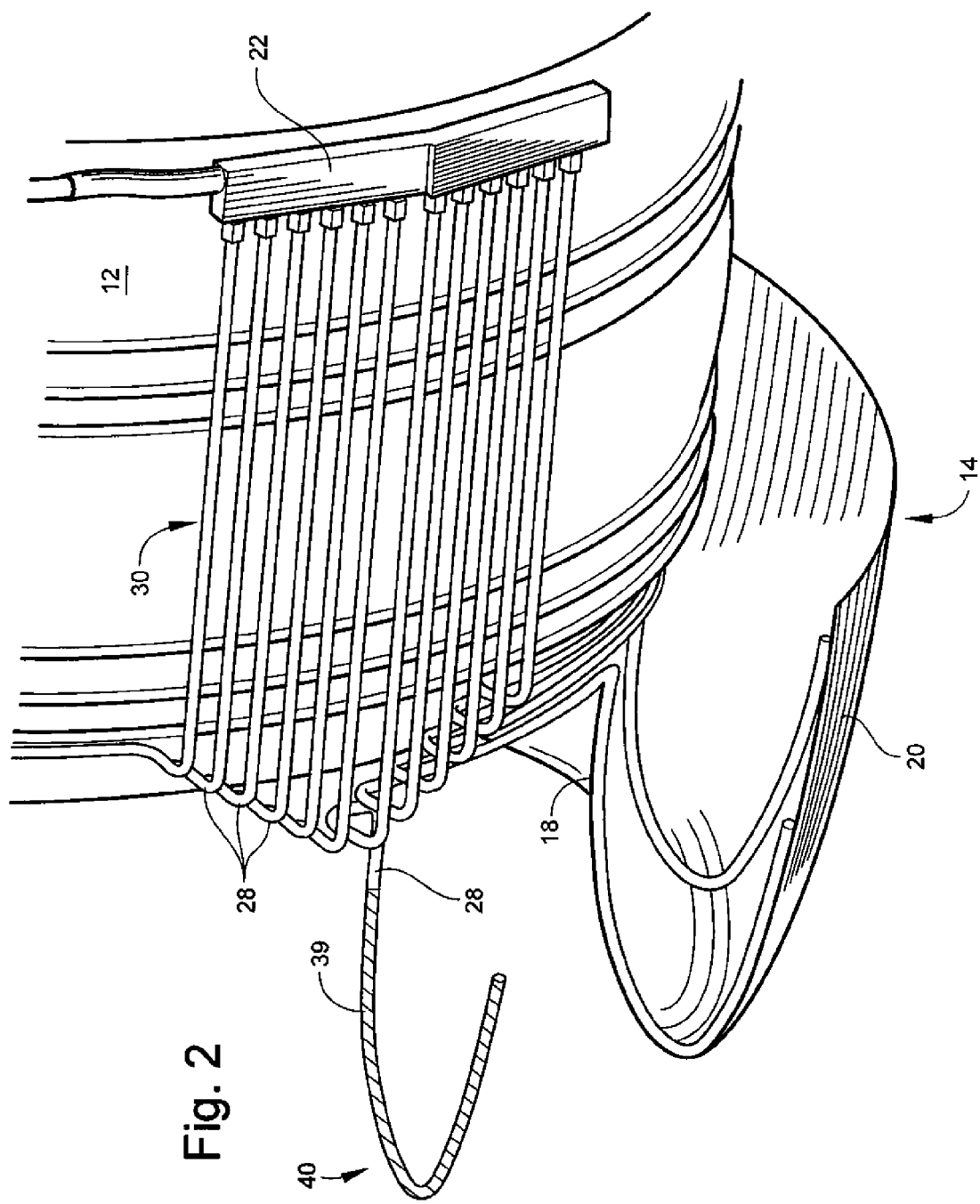
FIG. 2 is an enlarged cut-away view of a portion of the fan module of FIG. 1.

Referring to the drawings wherein identical reference numerals denote the same elements throughout the various views, FIGS. 1 and 2 illustrate a portion of a fan module 10 of a gas turbine engine, including an annular fan casing 12 which surrounds a rotating fan (not shown). The fan casing 12 is also surrounded by an annular fan cowling, which is not shown for clarity. An annular inlet cowling 14 is disposed forward of the fan casing 12. The inlet cowling 14 has a generally "U"-shaped cross-section with a curved portion defining an inlet lip 16, an inner wall 18 extending aft of the inlet lip 16 in a generally axial direction, and an outer wall 20 extending aft of the inlet lip 16 in a generally axial direction. The inner wall 18 forms a flowpath for air entering the fan casing 12, and the outer wall is exposed to external air flow.

The present invention is equally applicable to other engine configurations lacking a fan cowling, for example pure turbojet engines or turboprops.

A heat exchanger 22 is mounted on the outside of the fan casing 12. The heat exchanger 22 may simply be a housing with an open interior. In the illustrated example, oil from the engine's lubrication system enters the heat exchanger 22 through a scavenge line 24. After exiting the heat exchanger 22, it passes into a storage tank 25 until needed, at which time it flows back to the engines lubrication system through a supply line 26. The remainder of the oil storage, circulation, and distribution system connected to the scavenge and supply lines 24 and 26 is conventional within the gas turbine engine art, and not discussed here. If desired, the heat exchanger 22 could be connected to another type of heat source, such as a bleed air line, an electric source, or another fluid system within the engine.

A plurality of heat pipes 28 are mounted around the fan casing 12. Each heat pipe 28 includes an aft section 30, and a forward section 32, with a transition section 33 therebetween. The aft section 30 is generally axially extending. Its length is dependent on the distance between the heat exchanger 22 and the inlet cowling 14.

As illustrated, the forward sections 32 are disposed within the inlet cowling 14 in a circumferential array. Generally, it is considered desirable that the forward sections 32 have a shape conforming to the shape of the inlet cowling. As shown in FIG. 4, each forward section 32 is generally "U"-shaped and has an inner leg 34 which lies against the interior of the inner wall 18, an outer leg 36 which lies against the interior of the outer wall 20, and a bend 38 which lies against the interior of the inlet lip 16. The forward sections 32 may be secured in place against the inlet cowling 14 if desired, for example by brackets, adhesives, welding, fasteners, or the like. It is also possible that the forward section 32 could be configured in a "J" or "L" shape if needed to conform to the inlet cowling, or if it is desired to heat only a portion of it, by changing the relative lengths of the legs 34 and 36.

If necessary, the characteristics of the heat pipes 28, especially their forward sections 32, may be varied to accommodate their individual orientation. For example, a heat pipe 28 with a horizontal forward section 32, or a heat pipe 36 with a vertical forward section 32 at the bottom of the inlet cowling 14, may require a design providing stronger capillary action to ensure adequate condensate return, than a heat pipe 28 with its forward section 32 at the top of the inlet cowling 14.

The transition section 33 interconnects the aft section 30 and the forward section 32. It size and shape depends on the positioning of the associated forward section 32, but most of the transition sections 33 will extend in a circumferential direction to some extent. For example, the forward section 32A of the heat pipe 28A is located near a bottom or "6 o'clock" position of the inlet cowling 14, and therefore only a short transition section 33A is required. In contrast, the forward section 32B of the heat pipe 28B is located near a top or "12 o'clock" position of the inlet cowling 14, remote from the circumferential position of the heat exchanger 22. Accordingly, the transition section 33 has a relatively long, arcuate shape.

The majority of each of the heat pipes 28 is covered with an appropriate type of thermal insulation (not shown) to minimize heat transfer. Each forward section 32, or at least a portion thereof, is uninsulated. The hatching in FIG. 2 is illustrative of where a representative uninsulated portion 39 could be located. The uninsulated portion 39 is designated as a "cold" or "condenser" end 40. It should be noted that terms "hot", "evaporator", "cold", and "condenser", when used in relation to the heat pipes 28, describe the positioning of the heat pipes 28 in areas of relatively high or low temperature, and are not related to any particular aspect of the structure of the heat pipes 28 themselves.

While shown as circular in FIG. 5, the portion of the heat pipes 28 that lie against the fan casing 12 may be formed into oval, flatted, or other non-circular cross-sectional shapes to accommodate a desired cross-sectional area while improving volumetric packaging or heat transfer. For example, FIGS. 6 and 7 illustrate an alternative heat pipe 28' disposed inside an inlet cowling 14' and having a generally oval cross-section.

Each heat pipe 28 has an elongated outer wall 42 with closed ends which defines a cavity 44. The cavity 44 is lined with a capillary structure or wick (not shown) and holds a working fluid. Various working fluids, such as gases, water, organic substances, and low-melting point metals are known for use in heat pipes. The working fluid may be non-flammable so as to avoid introducing a fire hazard into the area of the fan casing 12 in the event of a leak or break in the heat pipe 28.

Figure 3:
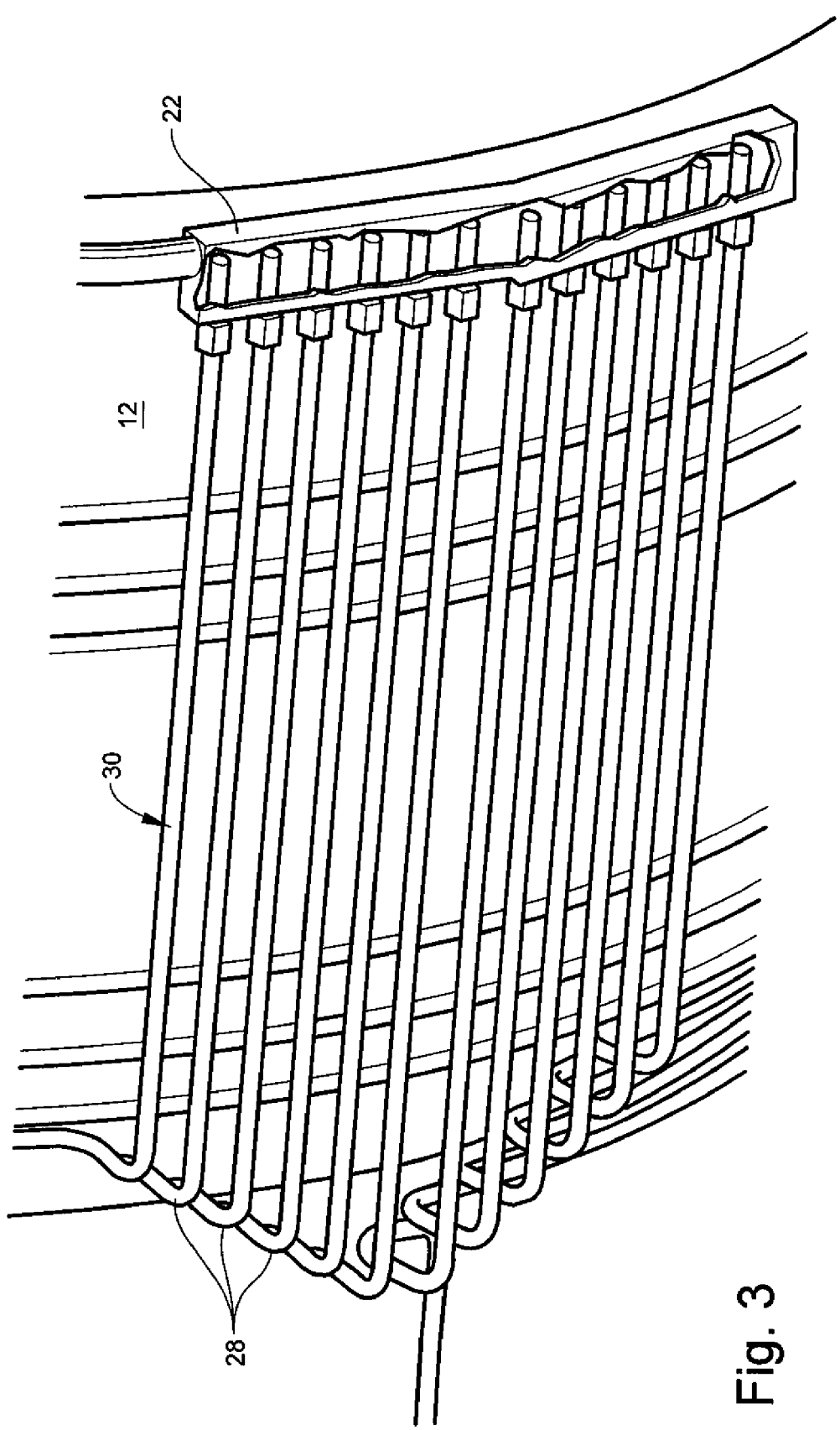
FIG. 3 is an enlarged perspective view of a heat exchanger mounted to the fan module of FIG. 1.
Figure 8:
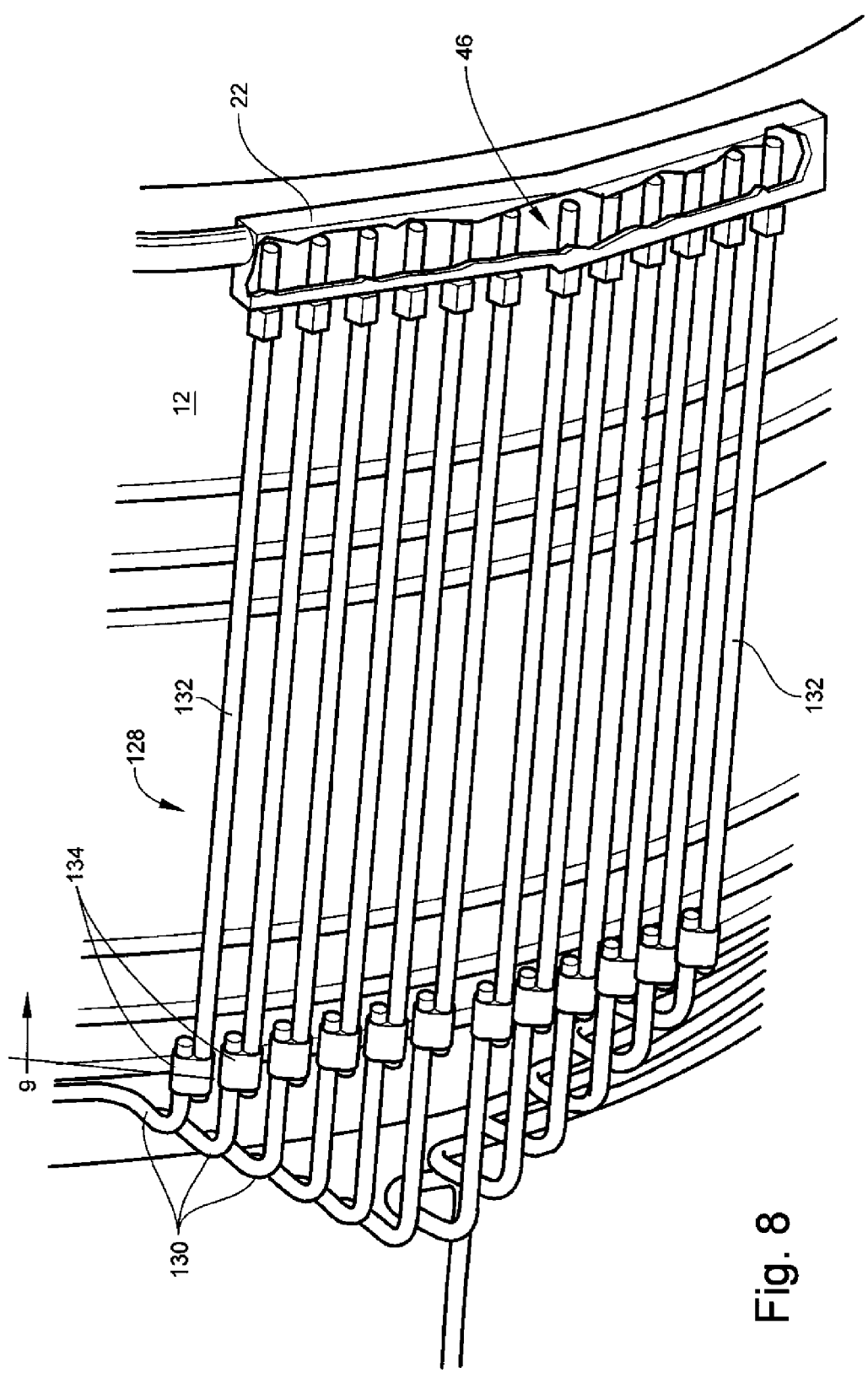
FIG. 8 is perspective view of a portion of the fan module of FIG. 1, showing an alternative arrangement of heat pipes to a heat exchanger.
Figure 9:
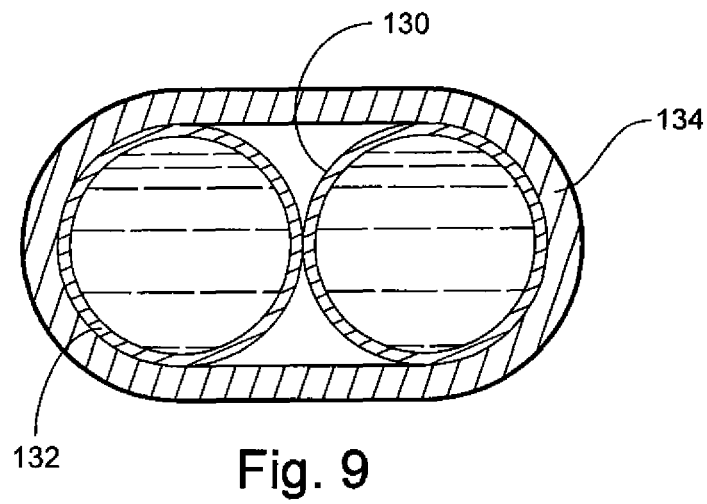
FIG. 9 is a cross-sectional view taken along line 9 of FIG. 8.

As most clearly seen in FIG. 3, one end of each heat pipe 28 is disposed inside the heat exchanger 22. This portion is designated as a "hot" or "evaporator" end 46.

The heat pipes 28 are highly efficient at transferring heat. For example, their effective thermal conductivity is several orders of magnitude higher than that of solid copper. The number, length, diameter, shape, working fluid, and other performance parameters of the heat pipes are selected based on the desired degree of heat transfer during engine operation. The operation of the heat pipes 28 are described in more detail below.

Additional thermal insulation, which is not illustrated for clarity, may be provided within the heat transfer system wherever it is desired to prevent heat loss. For example, insulation may be placed around the exterior of the heat exchanger 22.

FIGS. 8-11 depict an alternate arrangement of heat pipes 128. The heat pipes 128 are substantially similar to heat pipes 28 in their overall shape, size, and function. However, each heat pipe 128 is a compound heat pipe including a front heat pipe 130 carried by the inlet cowling 14 (see FIG. 2) and a rear heat pipe 132 carried by the fan casing 12. The front heat pipe 130 roughly corresponds in shape and size to the forward section 32 and the transition section 33 of the heat pipe 28 described above, and the rear heat pipe 132 roughly corresponds in shape and size to the aft section 30 of the heat pipe 28 described above. At each location where a front heat pipe 130 meets a rear heat pipe 132, two are joined together using a coupler 134. The couplers 134 are made of a material with relatively high thermal conductivity, such as a metal alloy, and are assembled, bonded, molded, or otherwise formed around the front and rear heat pipes 130 and 132. In the example shown in FIG. 9, the front and rear heat pipes 130 and 132 are of a circular cross-section and contact each other essentially along a line parallel to the length of the coupler 134 in the axial direction. Using this configuration, the front heat pipes 130 can be separated from the rear heat pipes 134, for example by disconnecting them at the coupler 134. This can be used to simplify maintenance and assembly, i.e. by allowing the inlet cowling 14 to be removed from the fan casing 12 without completely removing the compound heat pipes 128.

Figure 10:
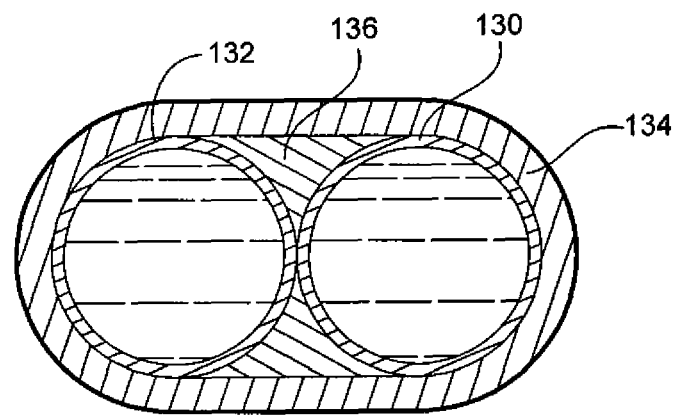
FIG. 10 is a cross-sectional view of a pair of heat pipes connected in an alternative configuration of a coupler.

The joints between the front and rear heat pipes 130 and 132 may be formed in a number of ways to increase the efficiency of heat transfer. For example, FIG. 10 depicts a possible configuration in which a filler 136 is disposed inside the coupler 134 in the voids between the two heat pipes. Any material with relatively high thermal conductivity may be used, such as metals, conductive pastes, or plastics. The use of the filler 136 effectively increases the surface area contact between the front and rear heat pipes 130 and 132 and thus improves heat transfer.

Figure 11:
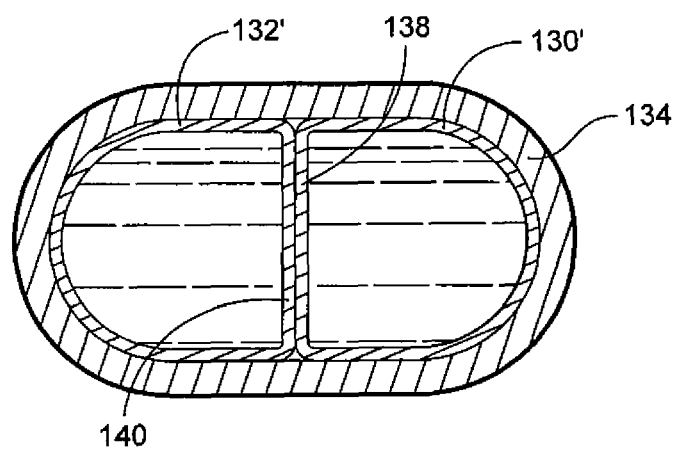
FIG. 11 is a cross-sectional view of a pair of heat pipes connected in another alternative configuration of a coupler.

FIG. 11 depicts another possible configuration using modified front and rear heat pipes 130' and 132'. At least the portions of the front and rear heat pipes 130' and 132' that are contained within the coupler 134 are formed in into complementary non-circular shapes, so that the front and rear heat pipes 1301 and 132' have abutting walls 138 and 140 with substantial conforming contact to enhance heat transfer.

In operation, oil which has absorbed heat from various parts of the engine is circulated into the heat exchanger 22 where it heats the hot or evaporator ends 46 of the heat pipes 28. The heat removal cools the oil to an acceptable working temperature so that it can be passed into the storage tank 25 and subsequently re-circulated through the engine. The working fluid within the heat pipes 28 absorbs that heat and evaporates. The vapor generated then travels through the cavities 44, and condenses at the cold portions 40 of the heat pipes 28, thereby transferring heat to the cold portions 40. A wick or other capillary structure that extends from one end of the heat pipe 28 to the other transports the condensed liquid back to the hot ends 46 by capillary action, thereby completing the circuit. Depending on the orientation of the heat pipe 28, the capillary structure may not be necessary. If compound heat pipes 128 are used, a similar process occurs, but heat is transferred from the heat exchanger 22 to the rear heat pipe 132, then from the rear heat pipe 132 to the front heat pipe 130 through the coupler 134. In either case, heat is transferred from the heat pipe 28 or 128 to the inlet cowling 14. The resultant heat transfer to the inlet cowling 14 is effective to prevent ice formation (i.e. anti-icing) and/or remove ice which has formed on the inlet cowling 14 (i.e. de-icing), depending on the heating rate.

The heat transfer system described herein, being passive, needs no valves and is sealed. The number, size, and location of the heat pipes can be selected to provide heat removal and transfer as needed. Depending upon the exact configuration chosen, the system performance may be used only for anti-icing or de-icing, or only for oil cooling, or for both purposes. The heat transfer system makes use of heat which is undesired in one portion of an engine and uses that heat where it is need in another portion of the engine, avoiding both the losses associated with prior art cooling systems and the need for a separate anti-icing heat source.

While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation, the invention being defined by the claims.

What is claimed is:

1. A heat transfer system for a turbine engine including an inlet cowling, the heat transfer system comprising:
   an annular fan casing terminating at a first end in an annular inlet cowling;
   a heat exchanger having a heat source passing therethrough disposed about a second end of the fan casing and mounted to an exterior surface thereof; and
   a plurality of heat pipes each extending between the heat exchanger and an interior of the inlet cowling, each of the heat pipes having an aft section extending in an axial direction across the exterior surface of the fan casing and terminating at one end within an interior cavity defined within the heat exchanger, a transition section extending along at least a portion of a circumferential surface of the first end of the fan casing, and a forward section terminating in generally axially extending portions connected through an arcuate portion, the forward section extending along the interior of the inlet cowling;
   wherein the forward sections of each of the heat pipes are radially spaced around the interior of the inlet cowling.

2. The heat transfer system of claim 1 wherein the forward section of each of the plurality of heat pipes is generally U-shaped.

3. The heat transfer system of claim 1 wherein the inlet cowling has a generally U-shaped cross-section.

4. The heat transfer system of claim 3 wherein the transition section of each of the plurality of heat pipes extends at least partially in a circumferential direction.

5. The heat transfer system of claim 1 wherein the plurality of heat pipes are disposed in contact with the interior of the inlet cowling, and each of the heat pipes are thermally coupled to the heat exchanger.

6. The heat transfer system of claim 1 wherein at least one of the aft and transition sections of each of the plurality of heat pipes are insulated and the forward sections of each of the plurality of heat pipes are uninsulated.

7. The heat transfer system of claim 1 wherein each of the plurality of heat pipes includes an elongated outer wall with closed ends defining a cavity that contains a working fluid.

8. The heat transfer system of claim 1 wherein the heat transfer system facilitates at least one of preventing ice formation on the inlet cowling and removing ice which has formed on the inlet cowling.

9. The heat transfer system of claim 1 wherein the heat source is engine oil from the turbine engine, and the heat transfer system facilitates maintaining the engine oil at an acceptable working temperature.

10. The heat transfer system of claim 1 wherein each of the plurality of heat pipes has a non-circular cross-sectional shape.

11. A method for transferring heat in a turbine engine having an inlet cowling, said method comprising:
   providing an annular fan casing terminating at a first end in an annular inlet cowling;
   providing a heat source about a second end of the fan casing and mounted to an exterior surface thereof;
   providing a plurality of heat pipes each extending between the heat source and an interior of the inlet cowling, each of the heat pipes having an aft section extending in an axial direction across the exterior surface of the fan casing and terminating at one end within an interior cavity defined within the heat exchanger, a transition section extending along at least a portion of a circumferential surface of the first end of the fan casing, and a forward section terminating in generally axially extending portions connected through an arcuate portion, the forward section extending along the interior of the inlet cowling; and
   thermally coupling the plurality of heat pipes to the heat source and thermally coupling the forward section of each of the plurality of heat pipes to the interior of the inlet cowling.

12. The method of claim 11 wherein sufficient heat is transferred to the inlet cowling so as to achieve at least one of preventing ice formation on the inlet cowling and removing ice which has formed on the inlet cowling.

13. The method of claim 11 wherein the heat source is engine oil from the turbine engine, and sufficient heat is removed from the engine oil to maintain the cooling oil at an acceptable working temperature.

* * * * *